Figure 1:
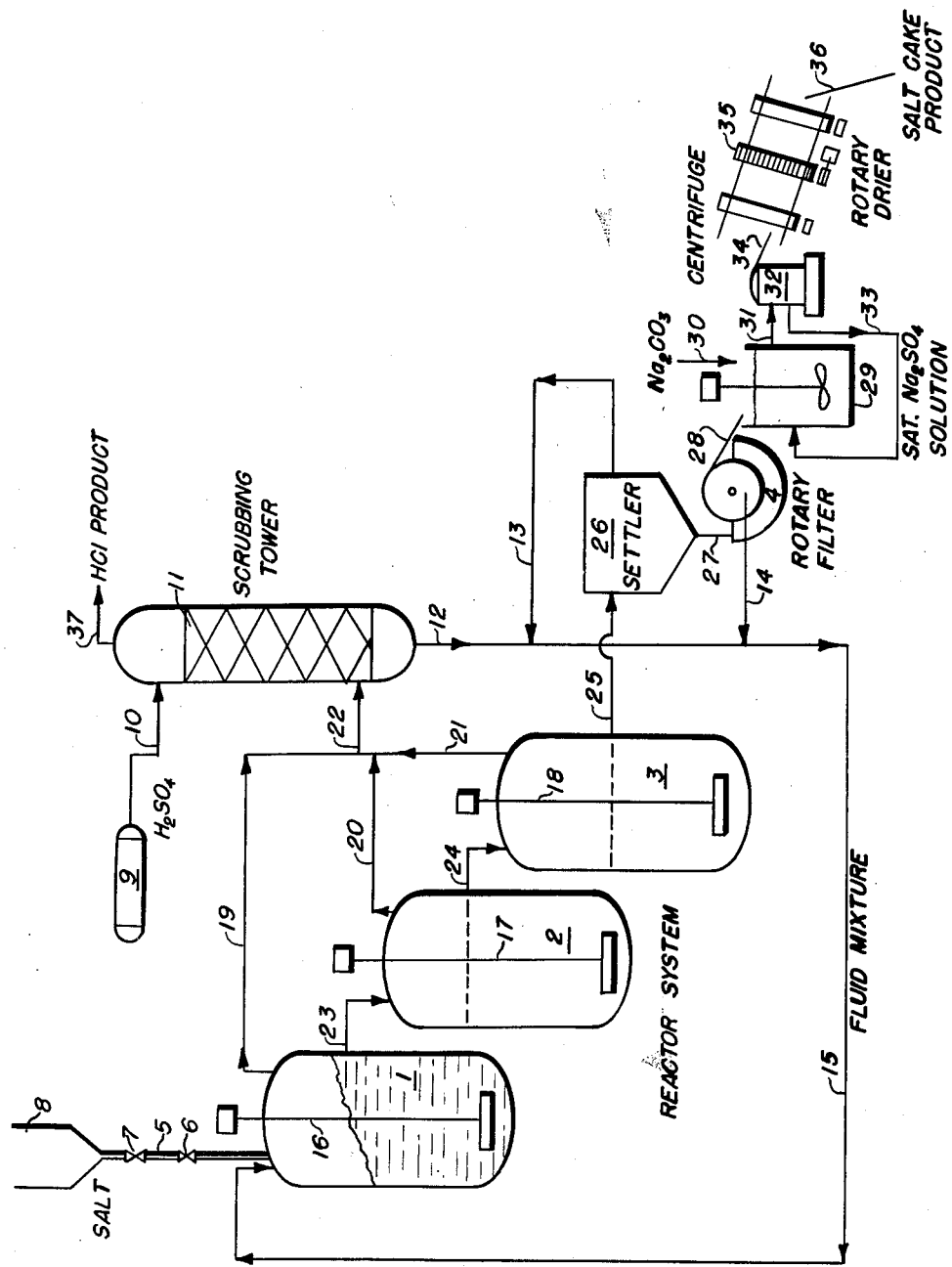

Sept. 11, 1956     A. P. GIRAITIS ET AL     2,762,689
MANUFACTURE OF HYDROGEN CHLORIDE
Filed March 10, 1954     2 Sheets-Sheet 1

INVENTOR.
ALBERT P. GIRAITIS
BY ARTHUR F. LIMPER
MARTIN B. SMITH
Kenneth Swartwood
ATTORNEY INVENTOR.
ALBERT P. GIRAITIS
ARTHUR F. LIMPER
MARTIN B. SMITH
BY Kenneth Swartwood
ATTORNEY United States Patent Office 2,762,689
Patented Sept. 11, 1956

2,762,689

MANUFACTURE OF HYDROGEN CHLORIDE

Albert P. Giraitis, Arthur F. Limper, and Martin B. Smith, Baton Rouge, La., assignors to Ethyl Corporation, New York, N. Y., a corporation of Delaware Application March 10, 1954, Serial No. 415,238

3 Claims. (Cl. 23—121)

This invention relates to the manufacture of hydrogen chloride and sodium sulfate or salt cake by the reaction of salt and sulfuric acid. More particularly, the invention comprises a new and improved process for carrying out this reaction under conditions much less drastic than heretofore possible and with the production of a concentrated high purity hydrogen chloride and a high grade of sodium sulfate.

The manufacture of hydrogen chloride presently is carried out according to two main methods, i. e., the "burning" reaction of gaseous chlorine and hydrogen in refractory lined combustion chambers, and by the so-called Mannheim process. The latter process, as carried out currently, is substantially the same as developed in Germany during the nineteenth century, and consists of the reaction of approximately one mole of sulfuric acid and two moles of sodium chloride in furnaces maintained with an interior temperature of the order of 600° C. Owing to this especially high temperature in a Mannheim furnace, the corrosive conditions encountered are especially severe. Hence, the parts of the equipment which are necessarily fabricated of metal are of cast ferrous metal construction and are designed with quite thick cross sections. Even with the unusually heavy operating parts employed, a major factor of expense in a Mannheim operation is the frequent replacement of such metal parts and the expense incurred therein not only from the cost of the replacements but the cost of the lost production time experienced. The hydrogen chloride from a Mannheim type furnace is relatively dilute, owing to leakage of air into the reaction space, a slight draft being maintained on the furnace chamber. Owing to this dilution, it is necessary to purify the gaseous product by adsorption and redistillation from aqueous solution.

The combustion type operation referred to above, while efficient from the viewpoint of requiring relatively simple equipment, suffers from the disadvantage of requiring elemental chlorine as a feed material rather than the more economical sodium chloride as a chlorine source.

Attempts have heretofore been made to devise processes which are satisfactory alternatives to the above described Mannheim type operation, or to develop improved techniques which avoid the principal drawbacks. Thus, in U. S. Patent 2,275,825 is shown a method of generating aqueous hydrochloric acid vapor and an aqueous solution of sodium sulfate by reacting sodium bisulfate and sodium chloride. The reaction is carried out in a reactor resembling a fractionating column, with steam being passed up through the reaction solution to supply heat and vaporize the hydrogen chloride produced. This process, of course, does not produce anhydrous hydrogen chloride gas.

An object of our invention is to provide a new process for producing a pure, anhydrous hydrogen chloride and a high quality salt cake, substantially free of sodium chloride contaminant. A further object is to provide a process for obtaining these products at relatively mild temperature conditions in contrast to the extreme temperature conditions required for a Mannheim type operation. A further object is to provide a process which is highly efficient in that it accomplishes substantially complete reaction of sodium chloride and sulfuric acid at a rapid rate and with highly efficient utilization of reaction space. An additional object is to provide a process for the manufacture of hydrogen chloride which is capable of operation at elevated pressures. Yet another object is to provide a process particularly susceptible to continuous operation. A still further object is to provide an integrated continuous process for manufacturing anhydrous hydrogen chloride and anhydrous sodium sulfate, or salt cake, and for recovering the sodium sulfate produced.

We have now discovered that the reaction of salt and sulfuric acid is advantageously carried out by feeding these reactants to a low melting liquid reaction medium composed of controlled proportions of sodium bisulfate, sodium sulfate, and water. The reaction of the salt and acid fed proceeds very rapidly but smoothly, generating anhydrous hydrogen chloride gas and sodium sulfate which is solidified as discrete granules suspended in, but easily separable from, the reaction medium.

The composition of the reaction medium is highly important to the attainment of the objects of the process. Fortunately, some latitude is permissible in the composition of the medium, but limitations exit with respect to this ternary system. In order to obtain the benefits of the process it is further necessary that concentrated sulfuric acid be employed as a feed reactant. By concentrated is meant sulfuric acid of at least about 90 percent concentration, and preferably 93 percent concentration or above, especially the 98 percent grade.

Figure 2:
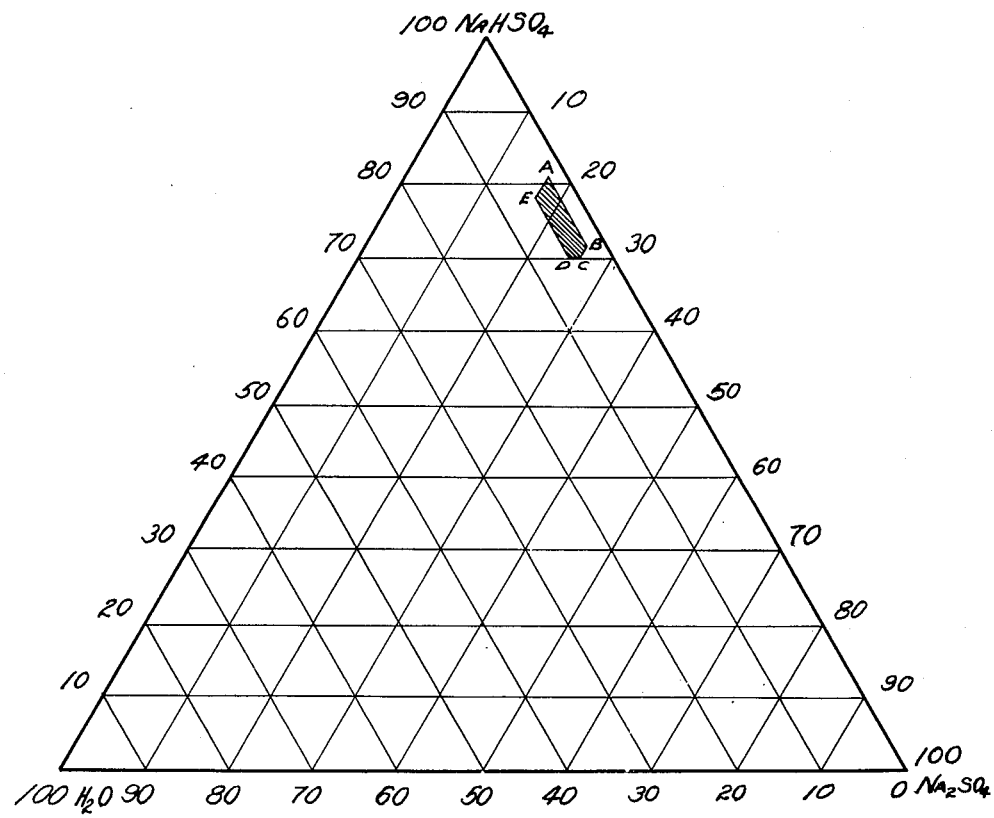

The details of the invention and the mode of operation are more fully understood from the example and data hereafter given and from the figures, Figure 1 being a schematic flow diagram of a preferred and continuous embodiment of the process, and Figure 2 being a graphical representation of the composition or proportions of the several components used for the reaction medium.

For the successful attainment of the objects of our process it has been found that a reaction medium must be provided which exhibits a variety of essential and varied attributes as enumerated below.

*Fluidity.*—An important function of the reaction medium is to provide a mobile medium which ensures that the salt particles fed are intimately contacted with the sulfuric acid throughout the reaction; that is, until the chloride content is fully displaced as hydrogen chloride. A further benefit from the higher fluidity of a reaction medium is the ease of separation which it provides, allowing easy disengaging of both the hydrogen chloride product and the sodium sulfate formed. In addition, a fluid mixture is easily transferred by conventional pumps and lines.

*Stability.*—By stability is meant principally that the reaction medium will not decompose at the temperature of operation to yield volatile impurities which appear in the hydrogen chloride product.

*Relative non-corrosive action.*—An essential attribute of the reaction medium is that it should be relatively non-corrosive to ferrous materials of construction at the operating temperatures of the process. In other words, the use of extremely heavy sectioned pots and agitator devices, and refractory calcining hearths as in a Mannheim type operation, should be unnecessary.

*Equilibrium with anhydrous sodium sulfate.*—An object of the process being the manufacture of an anhydrous sodium sulfate, it is essential that the sodium sulfate formed by the reaction should not be hydrated by the reaction medium, as a hydrated salt requires a calcining operation to be converted to the commercially desired product.

It has been found that the reaction media employed in the process meet the above requirements and make possible the objects of the invention. The reaction medium comprises sodium bisulfate plus sodium sulfate and a minor quantity of water. The sodium sulfate content is maintained at or near a saturation level in the sodium bisulfate. Further, the concentration of the sodium sulfate is at such a level that if the saturation limit in the sodium bisulfate is exceeded (either by the formation of additional sodium sulfate, or by a decrease in the temperature of the melt) then the anhydrous sodium sulfate is precipitated. In contrast, however, the total sodium sulfate content of the system is kept below a level at which an inordinately high temperature is required for maintaining the system in the liquid phase.

A final component of the reaction medium is a controlled and limited quantity of water. It has been found that even a small amount of water exerts a profound and drastic effect on the melting point and fluidity of the reaction medium, and further, that the greatest effect in this regard is reached at a water concentration which does not impart the increase in corrosive effect commonly expected from the presence of water in sulfate mixtures containing acidic components. It has been found that the melting points of our reaction media vary as much as 50° C. per one percent by weight of water present, in the concentration range employed.

The precise composition of the reaction medium as used in our process is subject to substantial variation according to the specific mode of operation, etc. As a general rule the preferred fluid medium as employed in the process will contain from 70 to 81 percent sodium bisulfate, from 17 to 26 percent sodium sulfate, and from 2 to 5 percent water. The variation in composition of the reaction medium is illustrated graphically by Figure 2, the figure being a ternary diagram of systems obtained by blending sodium bisulfate, sodium sulfate, and water. The field ABCDE corresponds to the family of compositions employed and having the above stated range of individual component proportions. It will be understood that minor deviations adjacent the boundaries of the said field can be tolerated, but at the expense of one or more of the necessary attributes for use in the process. Thus, slightly over 26 percent sodium sulfate can be maintained in the fluid or liquid phase, but this has the effect of raising the operating temperature level required. Similarly, if a water concentration of less than two percent is used, the required operating temperature is similarly increased. On the other hand, if the water content of the melt is maintained appreciably above the preferred range of 5 weight percent, the corrosive nature of the melt is appreciably raised without an off-setting benefit in the nature of a decreased melting point, it having been found that the maximum effect of water on melting point is attained up to a concentration of 3 percent. Above this concentration there is little further effect in the concentrations we prefer; that is, up to about 5 weight percent.

Figure 1 illustrates schematically a preferred embodiment of the process providing continuous operation and recovery. Referring to Figure 1, a three stage reactor system is shown including the agitator reaction vessels 1, 2, 3. Equipment for recovery is also illustrated. The recovery apparatus for the sodium sulfate includes a rotary filter 4, a centrifuge 32, and a rotary dryer 35. A scrubbing tower 11 is provided for scrubbing the hydrogen chloride gas and for removing entrained impurities.

In operation, solid sodium chloride feed is introduced to the initial reactor 1 through a line 5, which is a duct appropriately fitted with double control valves 6, 7, for regulating passage of the salt from storage hopper 8. Sulfuric acid from a storage tank 9 is fed through a line 10 to a drying or scrubbing tower 11, the function of which is hereafter explained. Sulfuric acid leaves the scrubbing tower 11 through a line 12. The acid is virtually unchanged and is combined with a stream of recirculated reaction medium returned in lines 13 and 14. The mixture is then fed to initial reactor 1 through line 15.

The reaction vessels 1, 2, 3 are cylindrical totally enclosed chambers, preferably fabricated of high silicon cast iron. External heating means, not shown, are provided to maintain the desired operating temperature. Agitation of the material within the reactors is provided by impeller type agitator assemblies 16, 17, 18. In the reaction, the hydrogen chloride produced is evolved as a gas which is taken overhead from the reactors through lines 19, 20, 21, these streams being combined in a manifold 22 and introduced at the base of the drying tower 11.

The reacting mixture overflows from reactor 1 through line 23 to the second reactor 2, and thence through overflow line 24 to reactor 3, at a rate determined by the feed rate. The effluent from final reactor 3 is passed through line 25 to the sodium sulfate purification or recovery section.

The sodium sulfate recovery section performs several functions. Anhydrous sodium sulfate, free of sodium chloride impurity and substantially free of acidity, is obtained as desired. In addition, the reaction medium is substantially completely recovered for recycle to the reaction section.

The reacted mixture received through line 25 is fed first to a settling chamber 26. The settling chamber utilizes natural gravity separation to accomplish an initial concentration of the sodium sulfate. Provision is made, by insulation or an external heat supply, to maintain the temperature of the settler and contents at a sufficiently elevated level to preserve high fluidity of the reaction mixture, this temperature being preferably of the order of about 250° C. or more. A thickened slurry of sodium sulfate is withdrawn through line 27 and fed to a rotary filter 4. A filter cake, comprising sodium sulfate crystals, wet with a small amount of reaction medium, is discharged by a doctor blade and chute 28 to a neutralizing tank 29. The neutralizing tank contains a saturated aqueous solution of sodium sulfate. In order to insure final delivery of a neutral product, a small amount of soda ash is introduced through line 30 to the neutralizing tank, in proportion to the acid content of the reaction medium contained as a residue which wets the solid particles of the filter cake.

In operation of the neutralizing tank, the system is maintained at a temperature above 35° C. If lower temperatures are used, a quantity of the sodium sulfate hydrate, $Na_2SO_4 \cdot 10\ H_2O$, will be produced. This defeats an object of the process, and is disadvantageous in that it will increase the load on a subsequent drying operation.

The discharge stream from the neutralizing tank 29 consists of a relatively thick slurry of neutralized anhydrous sodium sulfate in the saturated sodium sulfate solution. The slurry is discharged by line 31 to a centrifuge 32, which returns the liquid phase through line 33 to be reused in the neutralizing tank. The neutralized sodium sulfate, containing only an adherent film of liquid, is discharged from the centrifuge by chute 34 to the final step of drying in a rotary drier 35, which vaporizes the residual water content and discharges the final product in chute 36.

Turning to the path of the hydrogen chloride product, the gaseous hydrogen chloride from each reactor is collected in a single manifold 22, as already described. Under normal operating conditions, and particularly at low production rates, this hydrogen chloride is virtually free of moisture or of sulfur compound impurities. However, at high production rates, there is a tendency for the effluent gaseous product to entrain minor quantities of the reaction medium. Operation of the scrubbing tower 11 ensures that such entrained contaminant will be removed before the hydrogen chloride is transferred to a subsequent operation. The scrubbing tower is a conventional gas-liquid contactor, wherein the hydrogen chloride is intimately contacted with sulfuric acid fed to the system. The sulfuric acid removes any entrained impurities, the hydrogen chloride then being discharged as a pure, concentrated, anhydrous gas through line 37. As previously mentioned, the hydrogen chloride product may be generated at an elevated pressure if desired.

The example given below represents a typical operation of a preferred embodiment of the process described with reference to Figure 1.

EXAMPLE

Salt and sulfuric acid are supplied from the salt storage bin 8 and the sulfuric acid supply drum 9 at the rate of 85 parts of sulfuric acid to about 100 parts of salt. The sulfuric acid is of 98 percent strength, these feed ratios thus corresponding to about 2 moles of salt to one mole of sulfuric acid. The sulfuric acid is supplied initially to the scrubbing tower 11 for removal of entrained liquid droplets from the hydrogen chloride gas produced by the reaction.

Leaving the scrubbing tower 11, the sulfuric acid is joined by recycled reaction medium from the settler 26, fed through line 14 to the acid line 12, and also by recycled reaction medium from the filter 4, returned through line 14. The returned reaction medium streams are in the proportion of about 1140 pounds and 280 pounds per 100 pounds of sulfuric acid, from the settler and the filter, respectively.

The reaction medium is of the following composition:

| | Weight percent |
|---|---|
| Sodium bisulfate | 78 |
| Sodium sulfate | 18 |
| Water | 4+ |

If desired, the reaction medium recovered from the solid salt cake product may be returned directly to the reactor section without intermingling with the sulfuric acid. The reaction medium is maintained, while going through the settling and filtering operation, at a temperature of about 150° C. or preferably above, to assure fluidity.

The salt is fed directly to the initial reactor 1 through the supply line 5. The salt and acid react smoothly and rapidly in the reactors, the reacting system being maintained at a temperature of from 200 to 250° C. A total residence time of approximately one-half hour results in virtually complete reaction, that is, reaction to the point that there is virtually no chloride in the product slurry discharged from the final reactor 3 through the overflow line 25. The product slurry contains about 10 parts of solid anhydrous sodium sulfate crystals to 100 parts of reaction medium.

The product slurry passes to the settler 26, and the sodium sulfate solids are allowed to settle for a period sufficient to provide a bottom thickened slurry in which the solids contents is increased to the range of about 10 parts of solids to 20 parts of liquid reaction medium. This thickened bottoms slurry is passed by line 27 to the filter 4, and a product cake deposited on the filter drum. The filter cake, containing a small amount of adherent reaction medium, is discharged by chute 28 to the agitated bath 29 of a saturated aqueous sodium sulfate solution, to which sodium carbonate is added in the requisite proportions to react with the sodium bisulfate component of the reaction medium adhering to the sodium sulfate crystals. The proportions of sodium carbonate needed will vary of course with the efficiency of the filtration operation, but normally the requirements are about 5 to 10 pounds per 100 pounds of salt fed. Owing to the fact that the reaction medium is deposited as a thin surface film on the sodium sulfate crystals, the desired neutralization occurs very rapidly. The bath is maintained at a temperature of over 35° C., preferably from 35 to 50° C., and the agitation provided is very vigorous.

The treated aqueous slurry is overflowed to a centrifuge 32. The centrifuged crystals are discharged through a chute 34 to a rotary drier 35. Drying here is merely by warm air to evaporate the water component of the liquid residue wetting the centrifuged crystals. The final sodium sulfate product is discharged by a chute 36 to storage or freight cars. A virtually complete yield is obtained of high grade, acid free anhydrous sodium sulfate.

The hydrogen chloride gas delivered by the overhead line 37 from the scrubbing tower is free of any volatile impurities and being anhydrous is suitable for immediate use in subsequent operations.

As previously stated, an object of the invention is to provide a process which is operated at quite mild temperature conditions, contrasted with the conditions for a Mannheim furnace type operation. The process provides this result in very high degree. The reaction medium provided is completely fluid at temperatures of from 150–175° C. and above. Feasible operating temperatures range from 150° to 350° C., although the preferred temperature range is from 200° to 250° C. The preferred temperature range provides an especially beneficial combination of high fluidity, stability and non-corrosivity. Above 350° C., the corrosivity of the system increases rapidly.

The stability of the reaction mixture was shown by an analysis of a hydrogen chloride gas leaving a typical reaction vessel, which showed that no sulfate or sulfite ion was present. In contrast, the furnace gas from a Mannheim furnace consistently contains such appreciable amounts of volatile sulfur impurities that a scrubbing operation with an aqueous, relatively dilute, sulfuric acid wash is essential. The scrubbing tower described in connection with the preceding working example is not essential and it can be dispensed with if desired. Its sole function is to remove mechanically entrained droplets of reaction medium; an equivalent and equally effective method is to provide disengaging or knock-out devices in the gas lines from the reactors. The stability of the reaction medium employed in the process is particularly surprising in view of the fact that it is permanently chemically stable at the same temperature (240–250° C.) at which pure sodium bisulfate decomposes. Apparently the presence of the water and sodium sulfate components in the melt are responsible for this increase in stability.

The absence of rapid conversion was amply shown by corrosion tests of a variety of ferrous metals. The best material for reactor service was found to be the high silicon ferrous alloys. Corrosion rates only of the order of 0.01 inch a year were experienced in contrast to rates equivalent to several inches per year found in certain parts of a Mannheim furnace.

The normal feed ratio of salt and sulfuric acid is always maintained at approximately two moles of salt to one mole of sulfuric acid (as pure $H_2SO_4$). Slight variations, preferably on the side of excess acid, can be tolerated. In general, however, the stoichiometric proportions are desirable. Owing to the relatively low temperature of operation, there is virtually no decomposition of sulfuric acid, so that the yield on the sulfuric acid basis in the present process is appreciably better than in a Mannheim type process.

With respect to the proportions of salt and sulfuric acid to the circulating reaction medium, it is found highly desirable that these be in proportions providing from about 5 to 15 parts of solid sodium sulfate product to 100 parts of reaction medium. In terms of the feed rates, this corresponds to about 4 to 12.3 parts of salt, and 3.5 to 10.5 parts of sulfuric acid, to 100 parts of reaction medium. This range of feed rates will provide a product slurry having the desired proportions of solid sodium sulfate crystals present. Controlling the components in these ranges will assure high fluidity of the discharge stream from the reactor section and thus facilitate ease of transport. The proportions of solid sodium sulfate, on the other hand, are not so low that the recovery operations are inefficient.

It will be understood that numerous ramifications of the process can be carried out within the scope of the appended claims.

This application is a continuation-in-part of application Serial No. 222,282, filed April 21, 1951, now abandoned.

We claim:

1. The process of making concentrated and anhydrous hydrogen chloride and anhydrous sodium sulfate comprising reacting concentrated sulfuric acid, having a concentration of at least 90 weight percent $H_2SO_4$, with sodium chloride, in the proportions of one mole of acid to two moles of sodium chloride and at a temperature of about 200° to 250° C. and in a reaction medium consisting essentially of from 70 to 81 percent by weight of sodium bisulfate, from 17 to 26 percent sodium sulfate and from 2 to 5 percent water.

2. The continuous process of making concentrated and anhydrous hydrogen chloride and anhydrous sodium sulfate, comprising feeding sulfuric acid of about 98 weight percent $H_2SO_4$ content and sodium chloride, in the proportions of one mole of acid to two moles of sodium chloride, to a reaction zone, reacting the sulfuric acid and sodium chloride therein at a temperature of about 200° C. to about 250° C., the reaction being carried out in the presence of a liquid reaction medium consisting essentially of from 70 to 81 percent by weight sodium bisulfate, from 17 to 26 percent sodium sulfate and from 2 to 5 percent water, discharging gaseous hydrogen chloride formed from the reaction zone and withdrawing the sodium sulfate formed in suspension in said reaction medium, separating the sodium sulfate therefrom while maintaining at substantially the reaction temperature, and recycling the reaction medium to the reaction zone.

3. The process of making pure anhydrous hydrogen chloride gas and solid anhydrous sodium sulfate comprising continuously providing a hot, liquid reaction medium formed from 70 to 81 weight percent sodium bisulfate, from 17 to 26 percent sodium sulfate, and from 2 to 5 percent water, adding thereto sodium chloride and sulfuric acid in proportions of approximately two moles of sodium chloride to one mole of acid, the sulfuric acid having a concentration of at least 93 percent the sodium chloride being in proportions of from about 4 to about 12 parts by weight to 100 parts of the reaction medium, maintaining the so-formed reaction mixture at a temperature of about 200° to 250° C. for a reaction period of about one-half hour while agitating vigorously, forming thereby anhydrous hydrogen chloride gas, and a reacted mixture comprising solid anhydrous sodium sulfate crystals suspended in the said reaction medium, separating the reacted mixture into a substantially solids free reaction medium portion and a solid sodium sulfate portion comprising the sodium sulfate crystals coated with an adherent film of said reaction medium, maintaining the reaction medium at substantially reaction temperature during said separation, recycling the reaction medium portion, and treating the sodium sulfate crystals portion by agitating in a saturated aqueous solution of sodium sulfate at a temperature of over 35° C. while adding thereto solid sodium carbonate in amount sufficient to react with the sodium bisulfate component of the adherent coating on the sodium sulfate crystals, then separating said treated anhydrous sodium sulfate crystals and drying.

References Cited in the file of this patent

UNITED STATES PATENTS

| | | |
|---|---|---|
| 1,693,217 | Benjamin | Nov. 27, 1928 |
| 1,729,431 | Adamson | Sept. 24, 1929 |
| 1,868,946 | Low | July 26, 1932 |
| 2,275,825 | Lewis | Mar. 10, 1942 |
| 2,475,752 | Nachod | July 12, 1949 |